US012647151B2

(12) United States Patent
Prasad et al.

(10) Patent No.: US 12,647,151 B2
(45) Date of Patent: Jun. 2, 2026

(54) COMPOSITE SURFACE SYSTEM FOR WIRELESS COMMUNICATION

(71) Applicant: QUALCOMM Incorporated, San Diego, CA (US)

(72) Inventors: Narayan Prasad, Westfield, NJ (US); Jorge Fabrega Sanchez, San Diego, CA (US); Tao Luo, San Diego, CA (US); Junyi Li, Greentown, PA (US); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 18/821,774

(22) Filed: Aug. 30, 2024

(65) Prior Publication Data

US 2026/0066950 A1 Mar. 5, 2026

(51) Int. Cl.
*H04B 7/04* (2017.01)

(52) U.S. Cl.
CPC ................................. *H04B 7/04013* (2023.05)

(58) Field of Classification Search
CPC .................................................... H04B 7/04013
USPC ................................................. 375/267, 299
See application file for complete search history.

(56) References Cited

U.S. PATENT DOCUMENTS

| | | | |
|---|---|---|---|
| 2021/0143555 A1 | 5/2021 | Akselrod et al. | |
| 2024/0039608 A1* | 2/2024 | Wang ................... | H04B 7/0695 |
| 2024/0079791 A1 | 3/2024 | Pala et al. | |
| 2024/0195458 A1* | 6/2024 | Oh ..................... | H04B 7/04013 |
| 2024/0204393 A1 | 6/2024 | Dutta et al. | |
| 2024/0284522 A1* | 8/2024 | Dutta ................. | H04B 7/15557 |
| 2025/0007563 A1* | 1/2025 | Khayatzadeh ..... | H04B 7/04013 |
| 2025/0048230 A1* | 2/2025 | Yapici ............... | H04B 7/15507 |
| 2025/0199158 A1* | 6/2025 | Eichenholz ........... | G01S 13/865 |

OTHER PUBLICATIONS

International Search Report and Written Opinion PCT/US2025/038869 ISA/EPO Nov. 5, 2025.

* cited by examiner

*Primary Examiner* — Emmanuel Bayard
(74) *Attorney, Agent, or Firm* — Harrity & Harrity LLP/Qualcomm Incorporated

(57) ABSTRACT

Various aspects of the present disclosure generally relate to wireless communication. In some aspects, a composite surface system may include a transmissive surface (TS) component capable of transmitting a wireless communication signal incident on the TS component, transmitting the wireless communication signal within a transmissive field-of-view (FoV), and configured to limit signal strength loss of one or more radio frequencies of the wireless communication signal. In some aspects, the composite surface system may include a reflective surface (RS) component capable of reflecting the wireless communication signal within a reflective FoV. The RS component may include a non-uniform pattern region associated with controlling a size of the reflective FoV.

20 Claims, 11 Drawing Sheets

500 ⟶

750

510b1
510b2
510b3
510a
510b4
510b5
510b6
505

520b1
520b2
520b3
520a
520b4
520b5
520b6

Non-uniform pattern

COMPOSITE SURFACE SYSTEM FOR WIRELESS COMMUNICATION

FIELD OF THE DISCLOSURE

Aspects of the present disclosure generally relate to wireless communication and specifically relate to techniques, apparatuses, and methods for a composite surface system for wireless communication.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some implementations, a composite surface system for wireless communication includes a transmissive surface (TS) component capable of transmitting a wireless communication signal incident on the TS component, the TS component capable of transmitting the wireless communication signal within a transmissive field-of-view (FoV), and the TS component configured to limit signal strength loss of one or more radio frequencies of the wireless communication signal; and a reflective surface (RS) component capable of reflecting the wireless communication signal within a reflective FoV, the RS component comprising a non-uniform pattern region associated with controlling a size of the reflective FoV.

In some implementations, a composite surface system for wireless communication includes a first TS component capable of transmitting a wireless communication signal incident on the composite surface system, the first TS component capable of transmitting the wireless communication signal within a first transmissive FoV, the first TS component comprising a first non-uniform pattern region associated with controlling a size of the first transmissive FoV; and a second TS component capable of transmitting the wireless communication signal within a second transmissive FoV.

In some implementations, a composite surface system includes a TS component capable of transmitting an incident wireless communication signal within a transmissive FoV and configured to limit signal strength loss of one or more radio frequencies of the incident wireless communication signal; and a RS component associated with reflecting the incident wireless communication signal within a reflective FoV and capable of controlling a size of the reflective FoV.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
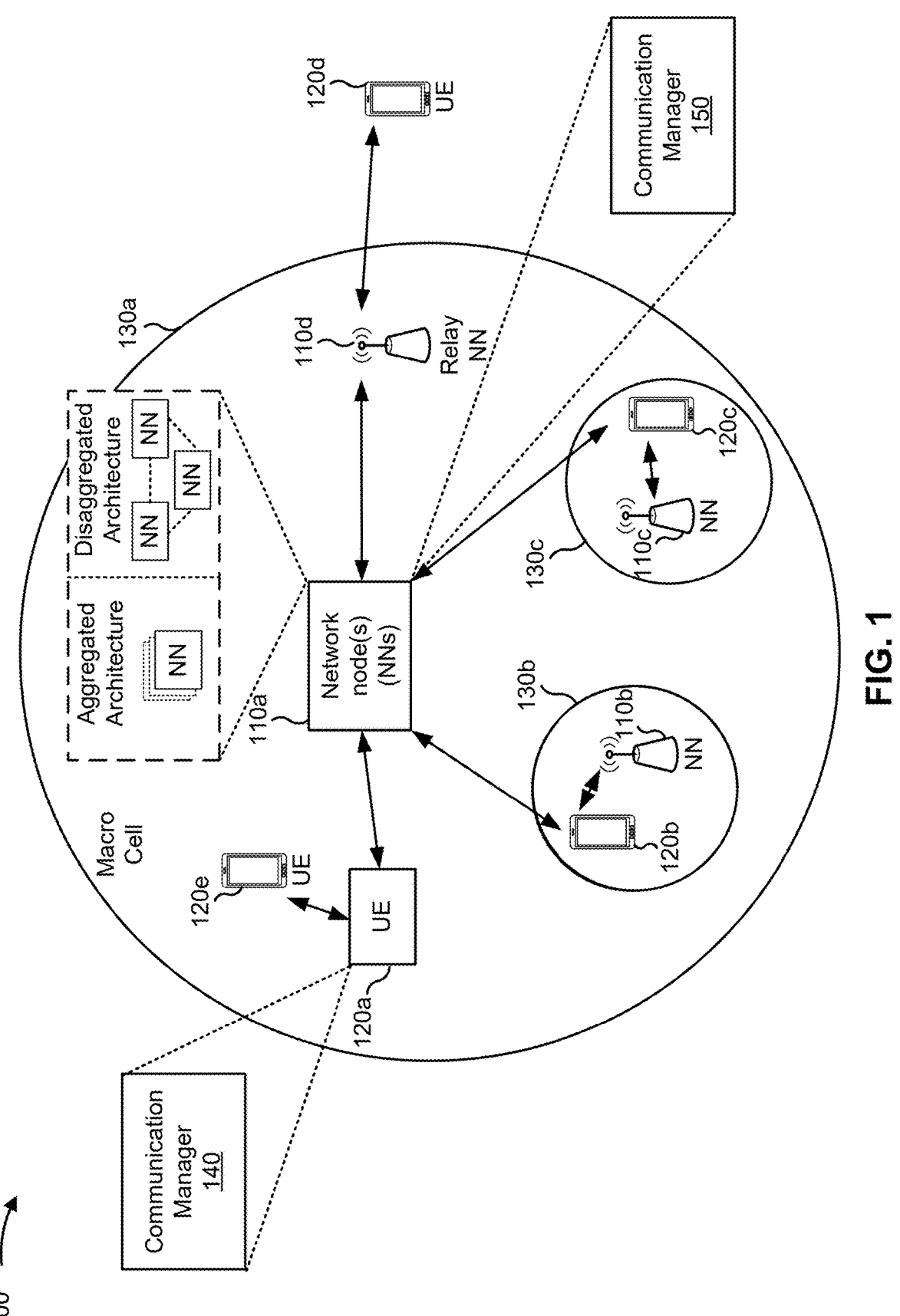
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Penetration loss is a limiting factor with respect to provisioning of cellular coverage by a wireless communication system. Penetration loss is particularly problematic with respect to communication at high-frequencies (e.g., millimeter wave and higher). In one example, materials such as concrete, tinted glass, or low-emissivity (low-E) glass may pass through wireless communication signals (e.g., transmitted by an outdoor network node) incident thereon, but only after significant weakening of strength of the wireless communication signal. Therefore, user equipments (UEs) that are indoors often have poor cellular signal quality, which further deteriorates as these devices move further indoors (e.g., away from a building façade). A similar penetration loss problem exists in a scenario in in which a UE is in a vehicle (e.g., a bus, an automobile, a train), where a material of the vehicle (e.g., a low-E glass window) reduces signal strength.

One technique to address the penetration loss issue uses a so-called intelligent surface as a transmissive surface to improve out-to-in coverage in a wireless communication system. However, an intelligent surface requires the use of transmissive surfaces that are not passive but, rather, transmissive surfaces that can be dynamically configured to redirect and pass through incident wireless communication signals. This, configurability, however, requires tunable electronic components and a power supply, which may be expensive and/or complex to implement or control.

Another technique to address the penetration loss issue is to use a treated glass on a building façade to reduce penetration loss. However, the use of treated glass alone may not provide a solution for customized coverage for some practical use-cases. Therefore, treated glass alone may be insufficient to adequately improve coverage in some scenarios.

Various aspects relate generally to a composite surface system for wireless communication. Some aspects more specifically relate to a composite surface system for enabling enhanced communication (e.g., improved coverage) in an out-to-in scenario. In some aspects, A composite surface system may include a transmissive surface (TS) component that is capable of transmitting a wireless communication signal incident on the TS component. The TS component may be capable of transmitting the wireless communication signal within a transmissive field-of-view (FoV), and may be configured to limit signal strength loss of one or more radio frequencies of the wireless communication signal. Further, the composite surface system may in some aspects include a reflective surface (RS) component that is capable of reflecting the wireless communication signal within a reflective FoV. The RS component may comprise a non-uniform pattern region associated with controlling a size of the reflective FoV. Additional details of such a composite surface system are described below.

Additionally, or alternatively, a composite surface system may include a first TS component capable of transmitting a wireless communication signal incident on the composite surface system. The first TS component may be capable of transmitting the wireless communication signal within a first transmissive FoV and may comprise a first non-uniform pattern region associated with controlling a size of the first transmissive FoV. Further, the composite surface system may in some aspects include a second TS component capable of transmitting the wireless communication signal within a second transmissive FoV. In some aspects, the second TS component may include a uniform pattern region configured to limit signal strength loss of one or more radio frequencies of the wireless communication signal, or may include a second non-uniform pattern region associated with controlling a size of the second transmissive FoV. Additional details of such a composite surface system are described below.

Particular aspects of the subject matter described in this disclosure can be implemented to realize one or more of the following potential advantages. In some examples, by transmitting a wireless communication signal within one or more transmissive FoVs (while limiting signal strength loss) and reflecting the wireless communication signal within a reflective FoV, the described techniques can be used to reduce penetration loss in a wireless communication system and improve coverage for UEs located in indoor environments (e.g., inside a building, inside a vehicle, or the like). Further, by controlling a size of one or more FoVs in which the wireless communication signal is transmitted or reflected (while limiting signal strength loss during transmission), the described techniques can provide customized coverage in a given practical use-case, thereby providing flexibility for providing improved coverage in a given scenario.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements May be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120c.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively config-urable or configured to perform a set of functions may include a first processor configurable or configured to per-form a first function of the set and a second processor configurable or configured to perform a second function of the set, or may include the group of processors all being configured or configurable to perform the set of functions.

The processing system may further include memory cir-cuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communica-tively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may fur-ther include or be coupled with one or more modems (such as a Wi-Fi (for example, Institute of Electrical and Elec-tronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses com-ponents associated with the UE 120 including the processing system.

Some UEs 120 may be considered machine-type commu-nication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrig-erator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication net-work 100).

Some UEs 120 may be classified according to different categories in association with different complexities and/or different capabilities. UEs 120 in a first category may facilitate massive IoT in the wireless communication net-work 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complex-ity of NB-IoT devices and/or eMTC UEs, and mission-critical IoT devices and/or premium UEs. RedCap UEs may include, for example, wearable devices, IoT devices, indus-trial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) commu-nication protocols, device-to-device (D2D) communication protocols, vehicle-to-everything (V2X) communication pro-tocols (which may include vehicle-to-vehicle (V2V) proto-cols, vehicle-to-infrastructure (V2I) protocols, and/or vehicle-to-pedestrian (V2P) protocols), and/or mesh net-work communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, net-work nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

As indicated above, FIG. 1 is provided as an example. Other examples may differ from what is described with regard to FIG. 1.

Figure 2:
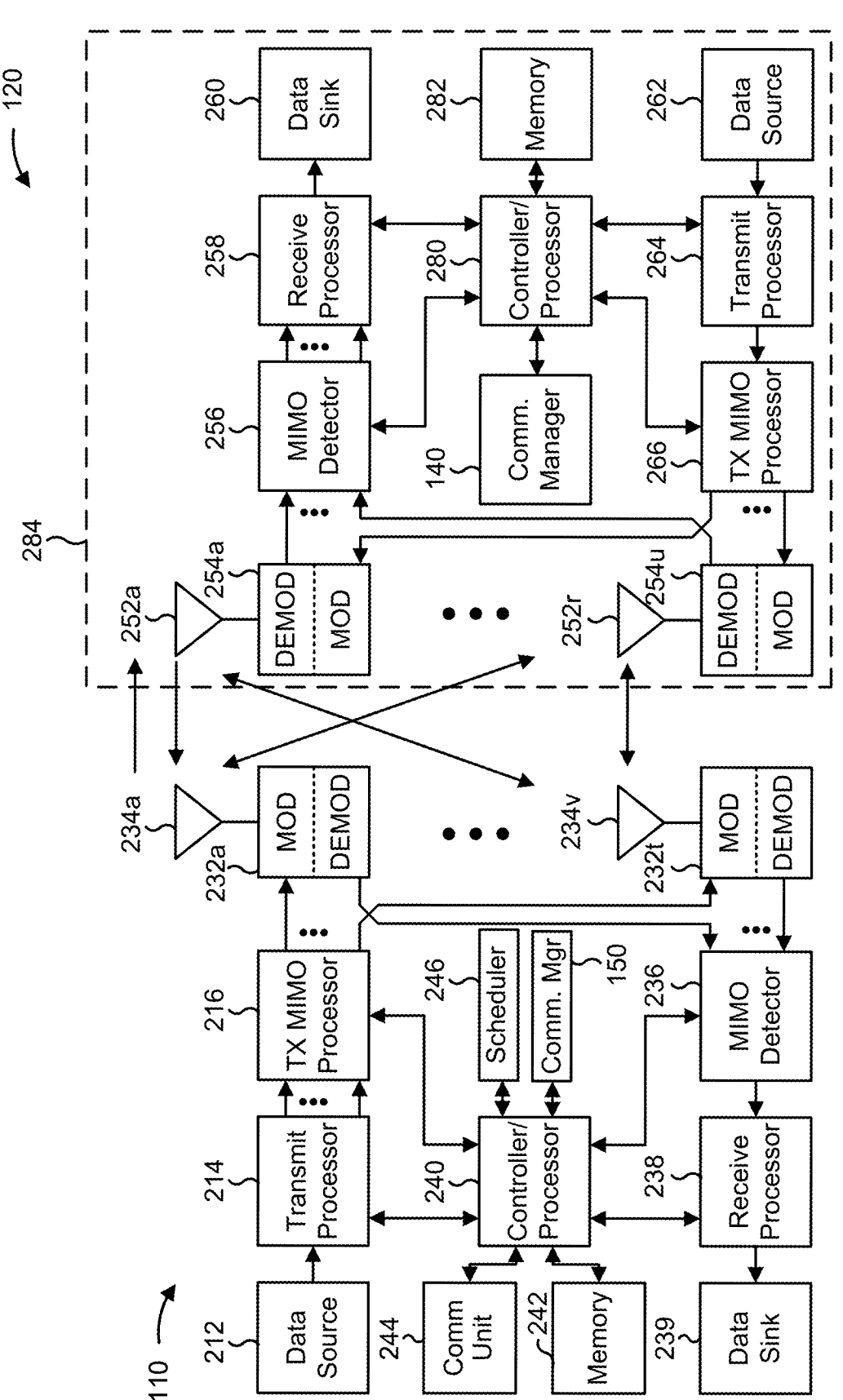
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
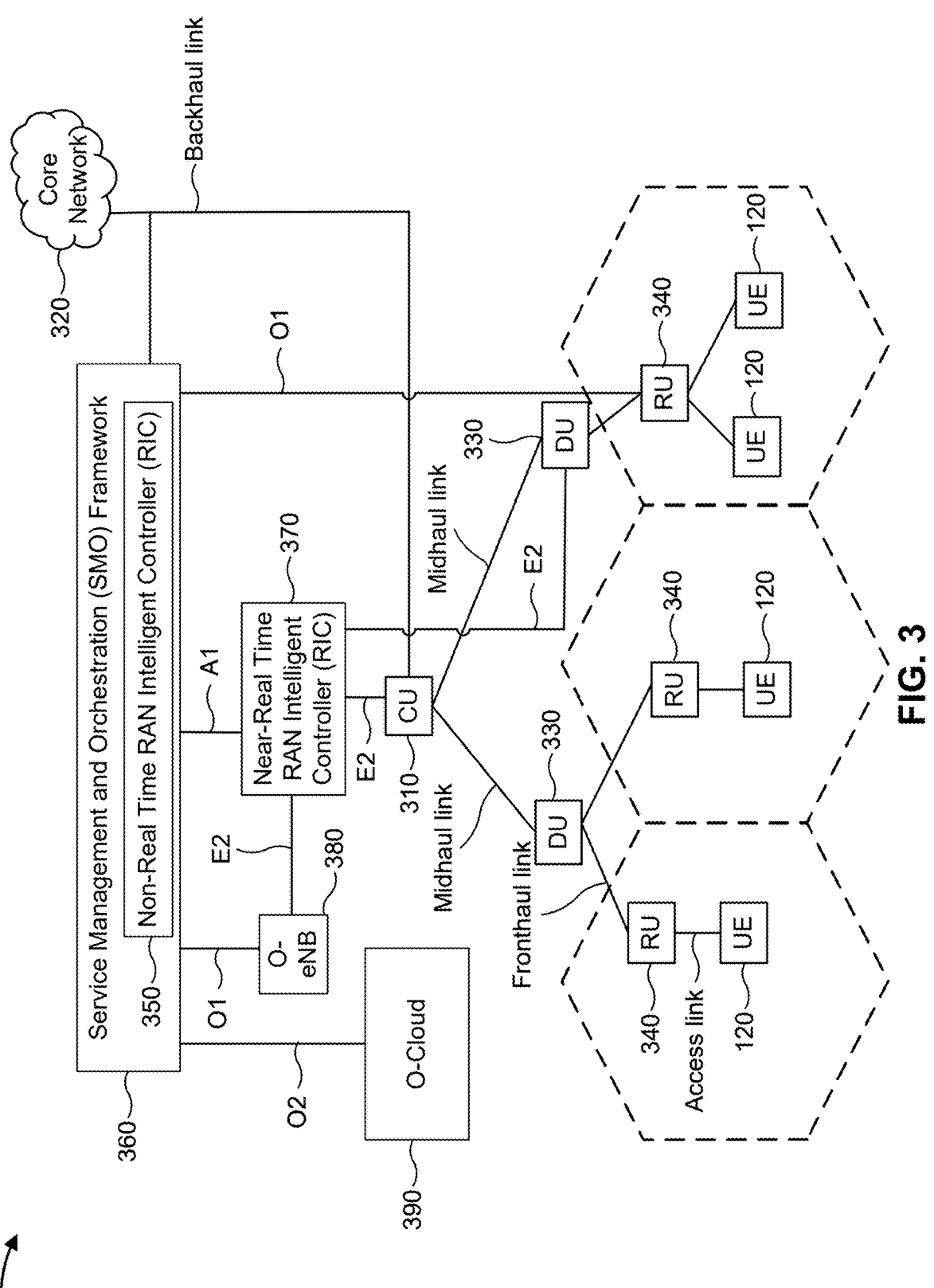
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with a composite surface system for wireless communication, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform processes as described herein. In some examples, executing instructions may include running the instructions, converting the instructions, compiling the instructions, and/or interpreting the instructions, among other examples.

As indicated above, FIG. 3 is provided as an example. Other examples may differ from what is described with regard to FIG. 3.

Figure 4A:
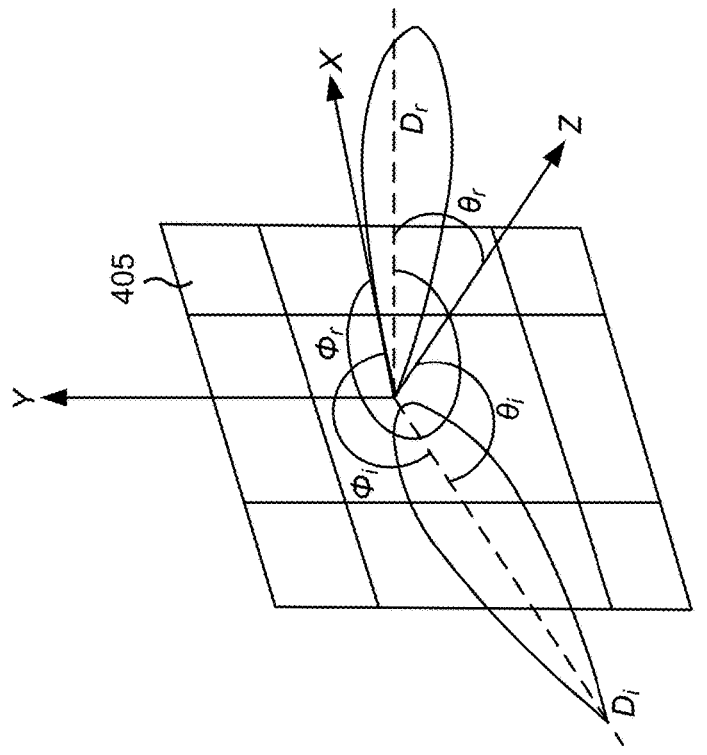
FIG. 4A is a diagram illustrating an example of wireless signal reflection, in accordance with the present disclosure.
Figure 4A:

FIG. 4A is a diagram illustrating an example 400 of wireless signal reflection, in accordance with the present disclosure. In some embodiments, wireless signal reflection refers to reflection of non-optical wireless signals. As shown in FIG. 4A, an incoming signal (along vector D_i) is characterized by an azimuthal angle Φ_i and an elevation angle θ_i with respect to the axes X, Y, and Z of a reflective surface 405. In FIG. 4A, the azimuthal and elevation angles are intended to indicate an axis from which a given angle is measured and do not indicate whether such an angle is a positive angle or a negative angle. The incoming signal is reflected by the reflective surface 405, which results in a reflected signal along vector D_r. The reflected signal is characterized by an azimuthal angle Φ_r and an elevation angle θ_r with respect to the axes X, Y, and Z. Azimuthal angles are measured using the projections of vectors D_i and D_r on an X-Y plane. For purposes of simplicity, these projections are not shown in FIG. 4A. A reflection metric η of the reflective surface 405 may be defined according to:

$$\eta_{max-min} = \min_{1 \le n \le L}\{|f(\theta_n, \phi_n)|\},$$

where $f$ represents reflected signal gain as a function of azimuthal and elevation angles and L represents a sampling of directions in a target reflective FoV. As used herein, "field-of-view" or "FoV" may refer to a two-dimensional and/or a three-dimensional region corresponding to cellular coverage (e.g., provided by one or more beams). In some aspects, an FoV may include a beam footprint. In some aspects, a size of a FoV (e.g., a reflective FoV or a transmissive FoV) may have a relatively larger size associated with a wide beam or a relatively smaller size associated with a narrow beam. The reflective surface (or the pattern imposed or etched or imparted on the reflective surface) may be optimized by maximizing the reflection metric. Alternatively, optimization of the reflective surface may be done by maximizing a Genie coefficient based reflection metric η, as shown below:

$$\eta_{genie} = -\frac{\sum_{n,m} \|f(\theta_n, \phi_n)|-|f(\theta_m, \phi_m)\|}{2L\left(\sum_{n=1}^{L} |f(\theta_n, \phi_n)|\right)}.$$

Another example of optimization of the reflective surface may be done by maximizing a diffusion coefficient based reflection metric η, as shown below:

$$\eta_{diffusion} = \frac{\left(\sum_{n=1}^{L} |f(\theta_n, \phi_n)|\right)^2 - \sum_{n=1}^{L} |f(\theta_n, \phi_n)|^2}{(L-1)\left(\sum_{n=1}^{L} |f(\theta_n, \phi_n)|^2\right)}.$$

22

Another example of optimization of the reflective surface may be done by maximizing a proportional fairness (PF) coefficient based reflection metric η, as shown below:

$$\eta_{PF} = \sum_{n=1}^{L} \log(|f(\theta_n, \phi_n)|)$$

Figure 4B:
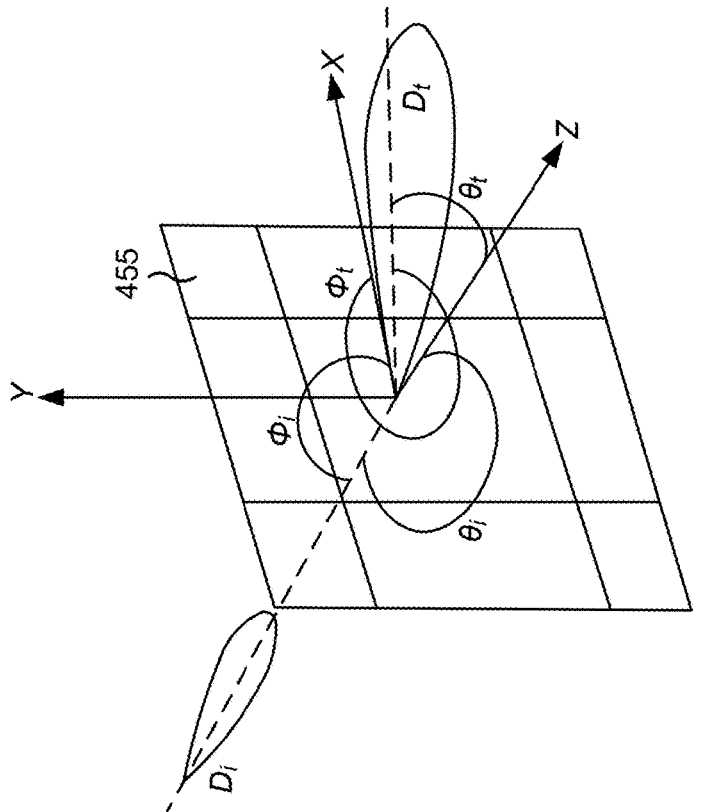
FIG. 4B is a diagram illustrating an example of wireless signal transmission, in accordance with the present disclosure.

FIG. 4B is a diagram illustrating an example 450 of wireless signal transmission (i.e., refraction), in accordance with the present disclosure. In some embodiments, wireless signal transmission or refraction refers to transmission or refraction of non-optical wireless signals. As shown in FIG. 4B, an incoming signal (along vector D_i) is characterized by an azimuthal angle Φ_i and an elevation angle θ_i with respect to the axes X, Y, and Z of a transmissive surface 455. In FIG. 4B, the azimuthal and elevation angles are intended to indicate an axis from which a given angle is measured and do not indicate whether such an angle is a positive angle or a negative angle. The incoming signal is transmitted (i.e., refracted) by the transmissive surface 455, which results in a transmitted signal along vector D_r. The transmitted signal is characterized by an azimuthal angle Φ_t and an elevation angle θ_t with respect to the axes X, Y, and Z. Azimuthal angles are measured using the projections of vectors D_i and D_t on an X-Y plane. For purposes of simplicity, these projections are not shown in FIG. 4B. A refraction metric η of the transmissive (refractive) surface 455 may be defined according to:

$$\eta_{max-min} = \min_{1 \le n \le L}\{|f(\theta_n, \phi_n)|\},$$

where $f$ now represents refracted signal gain as a function of azimuthal and elevation angles and L represents a sampling of directions in a target transmissive FoV. The refractive surface (or the pattern imposed or etched or imparted on the refractive surface) may be optimized by maximizing the refraction metric. Alternatively, optimization of the transmissive surface can be done by maximizing refraction metric η based on a Genie coefficient or a diffusion coefficient or proportional fairness coefficient, as described above, among other examples.

As indicated above, FIGS. 4A-4B are provided as examples. Other examples may differ from what is described with respect to FIGS. 4A-4B.

Figure 5A:
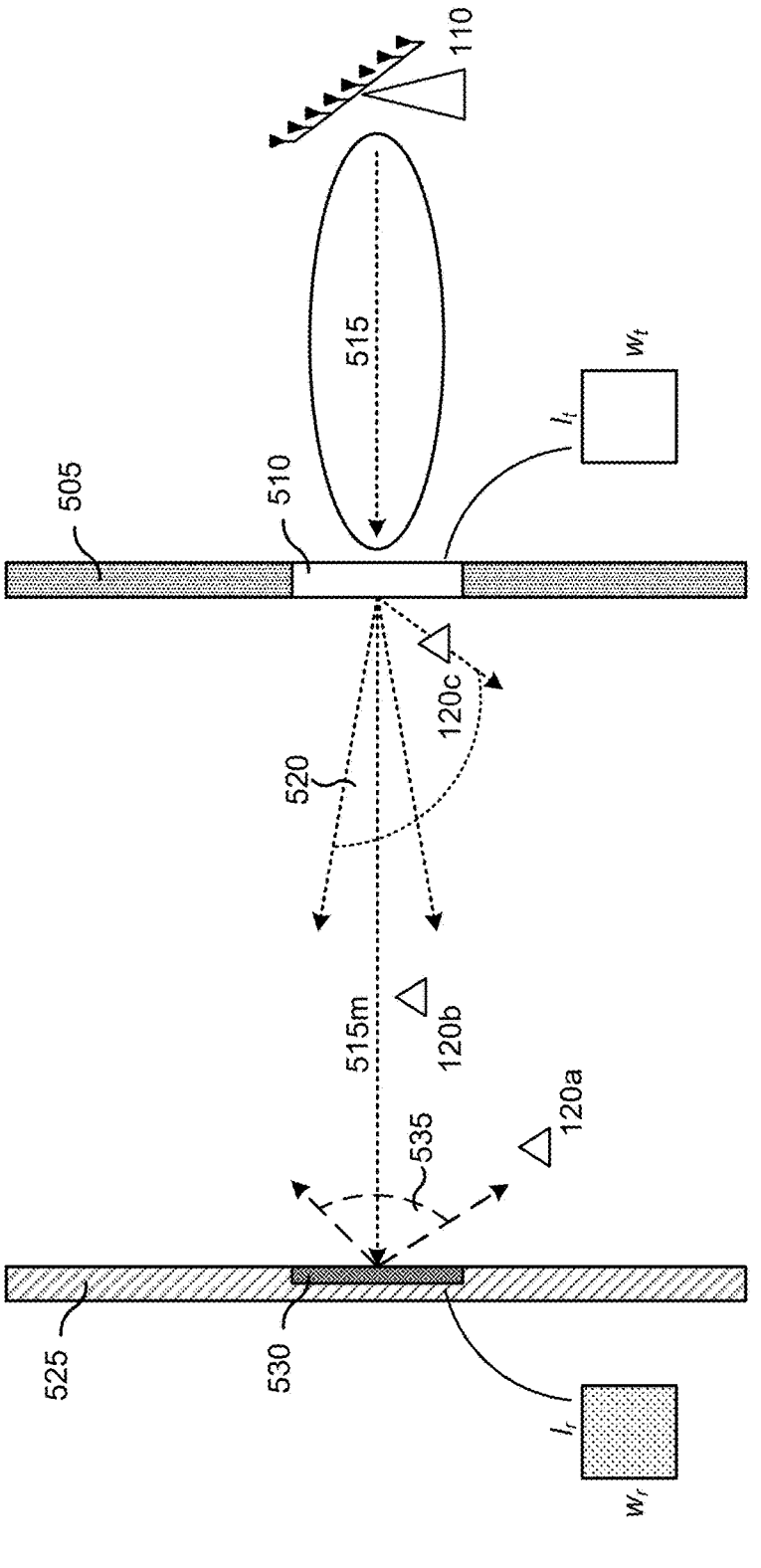
FIGS. 5A-5B are diagrams illustrating examples, respectively, of a composite surface system for wireless communication, in accordance with the present disclosure.
Figure 5B:
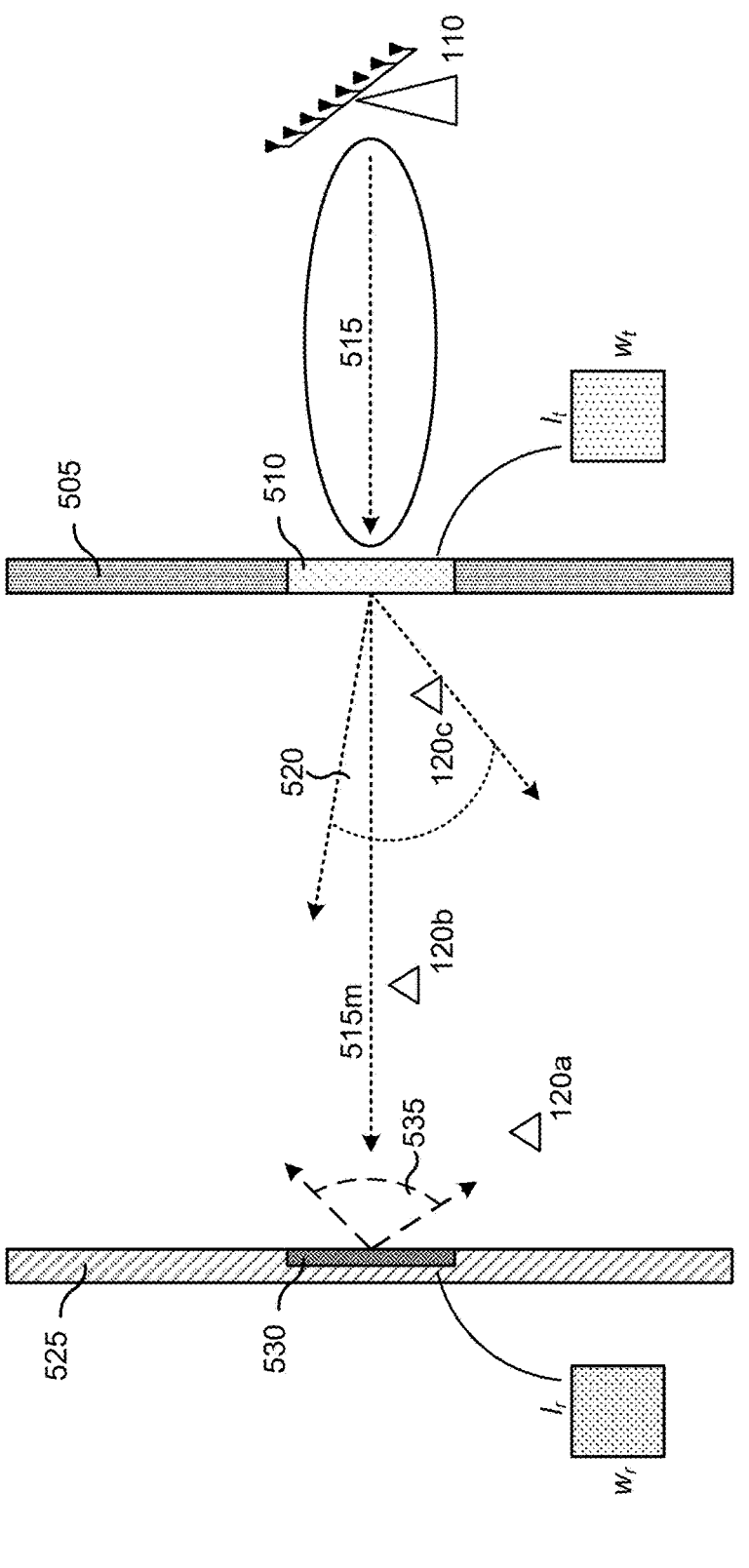

FIGS. 5A-5B are diagrams illustrating examples 500 and 550, respectively, of a composite surface system for wireless communication, in accordance with the present disclosure. As shown in FIGS. 5A and 5B, the examples 500 and 550 include a surface 505 that is at least partially transparent to light. In some aspects, the surface 505 may be, for example, a window (e.g., on a building, on a vehicle, or the like). As shown, the surface 505 includes a TS component 510 similar to transmissive surface 455 of FIG. 4B. In some aspects, the surface 525 may be, for example, a region of an interior wall or interior surface (e.g., in a building, in a vehicle, or the like). As shown, the surface 525 may include an RS component 530 similar to reflective surface 405 of FIG. 4A on the surface 525.

In some aspects, the TS component 510 is capable of transmitting a wireless communication signal 515 that is incident on the TS component 510. As shown, in some aspects, the TS component 510 is capable of transmitting the incident wireless communication signal 515 within a transmissive FoV 520. In some aspects, the TS component 510 is configured to limit signal strength loss of one or more radio frequencies of the incident wireless communication signal 515. As used herein, the TS component 510 being "configured to limit" signal strength loss means that the TS component 510 is configured to reduce an amount of signal strength loss as compared to the surface 505 without the TS component 510. In some aspects, the one or more radio frequencies of which signal strength loss is limited may include one or more one millimeter wave frequencies.

As illustrated in example 500 of FIG. 5A, the TS component 510 in some aspects includes a uniform pattern (e.g., non-patterned) region associated with reducing the signal strength loss of the one or more radio frequencies of the incident wireless communication signal 515. That is, in some aspects, the TS component 510 may include a uniform pattern region capable of passing through the incident wireless communication signal 515 with low loss. In some aspects, the uniform pattern region is configured so as to enable the TS component 510 to achieve transmission within a relatively narrow transmissive FoV 520, as illustrated in FIG. 5A. In operation, the uniform pattern region causes the TS component 510 to transmit the incident wireless communication signal 515 with a strong main component 515m. The RS component 530 can therefore be placed along a direction of the main component 515m, meaning that a strong incident wireless communication signal 515 is provided at the RS component 530. In some such aspects, main beam broadening may be observed closer to the TS component 510. In some aspects, a size (e.g., a length $l_t$ or a width $w_t$) of the TS component 510 and/or a direction at which the incident wireless communication signal 515 is incident on the TS component 510 may determine a distance threshold below which beam broadening of the incident wireless communication signal 515 as transmitted by the TS component 510 is observed. Thus, in some aspects, the TS component 510 may be configured (e.g., through size selection) to exploit main beam broadening to cover UEs 120 within a shorter target distance from the TS component 510 and within the transmissive FoV 520.

In some aspects, the RS component 530 is capable of reflecting the incident wireless communication signal 515 (e.g., after transmission by the TS component 510) within a reflective FoV 535. In some aspects, the RS component 530 may include a non-uniform pattern region associated with controlling (e.g., adjusting, modifying, adding multiple disjointed FoVs, or generating a wider FoV while minimizing nulls or directions within the FoV with significantly suppressed signal gain compared to other directions in that FoV) a size of the reflective FoV 535 compared to a size of the reflective FoV 535 of an RS component 530 including only a uniform pattern region. Thus, in some aspects, the non-uniform pattern region of the RS component 530 can serve to widen the reflective FoV 535 when compared to a uniform pattern region. As used herein, a uniform or non-uniform pattern may refer to a coating that may serve as a transmissive coating or a reflective coating, where such coating is applied to a substrate (e.g., a coating on a film applied to the substrate, a film that is the coating that is applied to the substrate, or a coating applied on a film where the film is the substrate) which could be an intermediate substrate or a final substrate. It is understood that, as used herein, an intermediate substrate can be a substrate configured to then be attached to yet another substrate, such as a window or a wall. To enable the transmissive or reflective properties, and to enable a particular FoV (wide, medium, or narrow, or multiple FoVs), the coating can comprise materials and/or structure (e.g., a layer structure (e.g., thickness, number, ordering, etc., of material layers) and/or features having a given size or shape disposed at a given density across the surface of the coating) that impart on it the desired transmissivity, reflectivity, FoV, etc. Hence, as used herein, a uniform pattern region refers to a region on a surface (e.g., a TS component 510 or an RS component 530), where all sub-regions of the region are uniform in terms of materials, structure, etc. Conversely, a non-uniform pattern regions refers to region of a surface (e.g., a TS component 510 or an RS component 530) that is not uniform, meaning that the materials, structure, etc., in at least one sub-region of the region is distinct from the materials, structure, etc., in at-least one other sub-region of the region. In an aspect in which a pattern is formed using a film, the same concept applies to the film (e.g., for a uniform pattern region, all sub-regions on the film have the same attributes). In some aspects, a size of a sub-region can be chosen based on constraints in a given scenario, such as optical visibility, aesthetics, and/or tinting impact, as well as desired RF performance. In practice, near-unity amplitudes or a 360 degree (°) phase-span for the RS component can be more easily realized. In some aspects, the RS component 530 may have a size (e.g., a length $l_r$ or a width $w_r$) selected so as to enable the incident wireless communication signal 515, as transmitted by the TS component 510, to be incident on the RS component 530.

In some aspects, the RS component 530 is configured to be placed within the transmissive FoV 520 such that the RS component 530 reflects the incident wireless communication signal 515 after the incident wireless communication signal 515 is transmitted by the TS component 510. That is, the RS component 530 may be within the transmissive FoV 520 so as to enable the RS component 530 to reflect the incident wireless communication signal 515 as transmitted by the TS component 510. In other words, the RS component 530 is configured to be placed in such a way so as to reflect the incident wireless communication signal 515 transmitted by the TS component 510.

In some aspects, as illustrated in examples 500 and 550, the TS component 510 is configured to be placed on the surface 505 (e.g., a first surface) in an environment and the RS component 530 is configured to be placed on the surface 525 (e.g., a second surface) in the environment, with the surface 525 being physically separated from the surface 505. That is, in some aspects, the TS component 510 and the RS component 530 are disjointed—meaning that the TS component 510 and the RS component 530 are on different, physically separate surfaces (e.g., different walls of a building).

With respect to example 500, a network node 110 transmits a wireless communication signal 515 such that the wireless communication signal 515 is incident on a TS component 510 of a surface 505 of a building in which a group of UEs 120 (e.g., UE 120a, UE 120b, and UE 120c) is located. The TS component 510 transmits the incident wireless communication signal 515 within a relatively narrow transmissive FoV 520. The incident wireless communication signal 515 (e.g., the main component 515m) is incident on a RS component 530 (e.g., on an interior wall of the building) of a surface 525, and the RS component 530 reflects the incident wireless communication signal 515 within a reflective FoV 535. In this example, the UE 120a is outside of the transmissive FoV 520. However, the UE 120a is within the reflective FoV 535 and, therefore, receives sufficient signal strength from the reflection of the incident wireless communication signal 515 by the RS component 530. Further, in this example, the UE 120b is within both the transmissive FoV 520 and the reflective FoV 535 and therefore receives sufficient signal strength to enable wireless communication, while also being robust to blockage or misalignment resulting from a change in orientation. The UE 120c is comparatively closer to the TS component 510 and is within the transmissive FoV 520 due to main beam broadening and, therefore, receives sufficient signal strength from the transmission of the incident wireless communication signal 515 by the TS component 510.

In some aspects, as illustrated in example 550 of FIG. 5B, the TS component 510 may include a non-uniform pattern region associated with controlling (e.g., adjusting, modifying, adding multiple disjointed FoVs, or generating a wider FoV while minimizing nulls or directions within the FoV with significantly suppressed signal gain compared to other directions in that FoV) a size of the transmissive FoV 520 (e.g., rather than or in addition to a uniform pattern region) compared to a size of the transmissive FoV 520 of a TS component 510 including only a uniform pattern region. In some aspects, the non-uniform pattern region may include a transparent film with a pattern that is on a substrate and affixed to a glass surface (e.g., the surface 505) or directly affixed to the glass surface. In some aspects, the non-uniform pattern region enables the TS component 510 to provide a broad transmissive FoV 520 (e.g., as compared to a transmissive FoV 520 achieved with a uniform pattern region). In some such aspects, the transmissive FoV 520 may have effective range up-to moderate distances from TS component 510. In some aspects, the patterning of the non-uniform pattern region is configured so as to avoid sharp nulls within the transmissive FoV 520 at distances near the TS component 510. In some such aspects, the main component 515m of the incident wireless communication signal 515 is strong relative to other components of the incident wireless communication signal 515 as transmitted by the TS component 510. In some aspects, the strong main component 515m can serve to provide a stronger incident signal to the RS component 530 along a main direction, as described above in connection with FIG. 5A.

With respect to example 550, a network node 110 transmits a wireless communication signal 515 such that the wireless communication signal 515 is incident on a TS component 510 of a surface 505 of a building in which a group of UEs 120 (e.g., UE 120a, UE 120b, and UE 120c) is located. The TS component 510 transmits the incident wireless communication signal 515 within a relatively wide transmissive FoV 520. The incident wireless communication signal 515 (e.g., the main component 515m) is incident on a RS component 530 (e.g., on an interior wall of the building) of a surface 525, and the RS component 530 reflects the incident wireless communication signal 515 within a reflective FoV 535. In this example, although the UE 120a is inside of the transmissive FoV 520, the signal strength within the transmissive FoV 520 may be insufficient to enable wireless communication. However, the UE 120a is within the reflective FoV 535 and, therefore, receives sufficient signal strength from the reflection of the incident wireless communication signal 515 by the RS component 530. Further, in this example, the UE 120b is within both the transmissive FoV 520 and the reflective FoV 535 and therefore receives sufficient signal strength to enable wireless communication, while also being robust to blockage or misalignment resulting from a change in orientation. The UE 120c is at a moderate distance from the TS component 510 within the transmissive FoV 520 due to the patterning of the TS component 510 and, therefore, and receives signal strength from the TS component 510 to enable wireless communication.

Notably transmissive or reflective surfaces described herein (e.g., TS component 510, RS component 530, or the like) may have optical properties (e.g., transmissive, reflective, etc.) that may or may not correspond to their properties for a non-optical wireless signal. For example, while an optically transmissive surface (e.g., a TS component 510) may be configured to be transmissive to a non-optical wireless signal, or may be transmissive to different degrees, a reflective surface (e.g., an RS component 530) configured to be reflective for non-optical wireless signals may or may not be optically reflective or may be reflective to different degrees.

In some aspects, if the network node 110 has access to information associated with a composite surface system such as those shown in examples 500 and 550, the network node 110 may configure a UE 120 to perform beam-training or management using multiple panels (and provision pilot repetition and time gaps sufficient to enable UE panel switching, depending on UE capability). Similarly, in some aspects, a UE 120 may be configured to sense presence of a composite surface system and transmit information associated with the composite surface system to the network node 110 or request additional gaps or reference signal repetition to enable beam-training.

As indicated above, FIGS. 5A-5B are provided as examples. Other examples may differ from what is described with respect to FIGS. 5A-5B.

In some aspects, the TS component 510 and the RS component 530 may in be on physically separate surfaces, as illustrated in FIGS. 5A and 5B. Alternatively, the TS component 510 and the RS component 530 may, in some aspects, be integrated on a single surface in an environment.

Figure 6A:
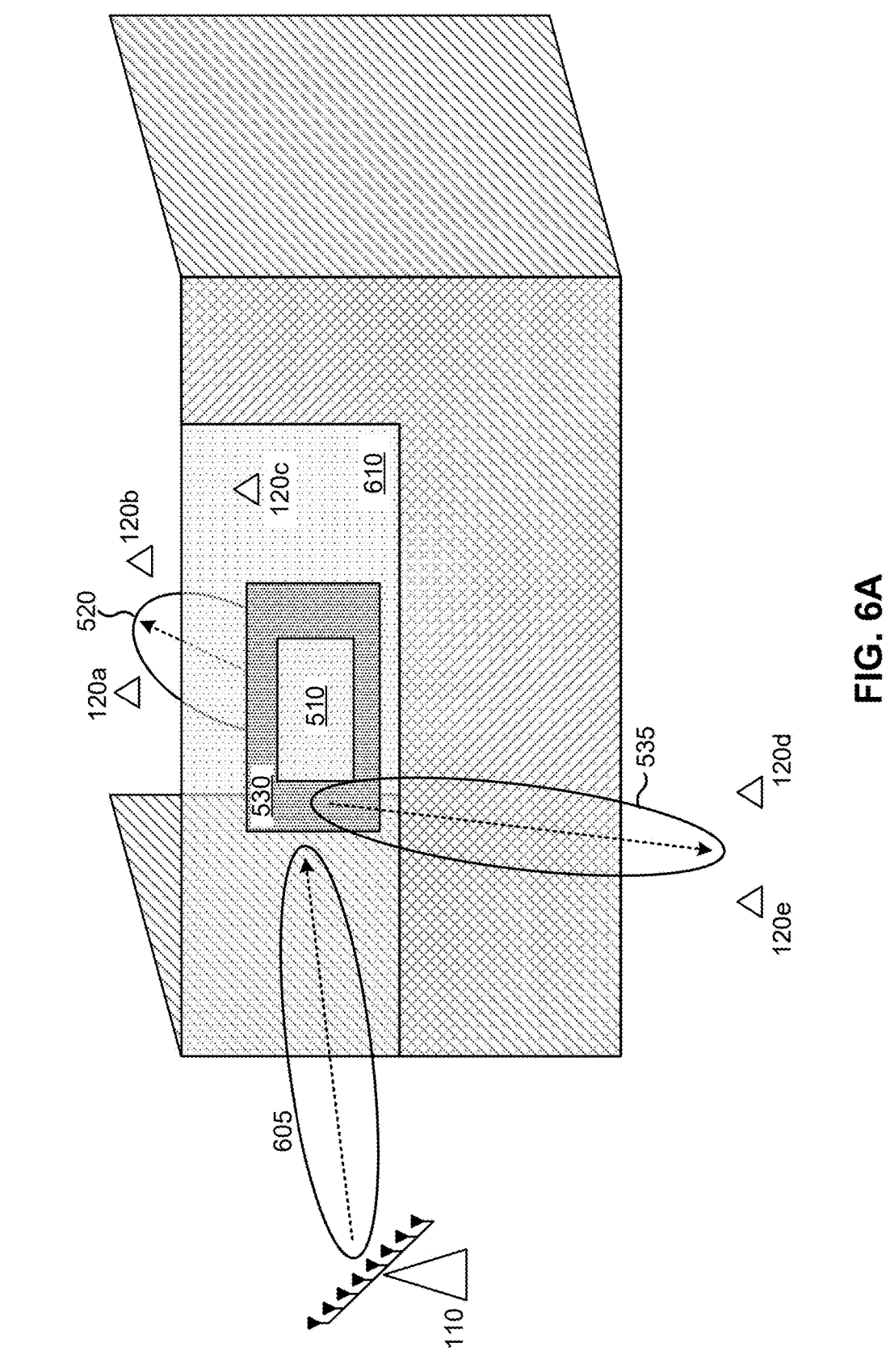
FIGS. 6A-6B are diagrams illustrating examples in which a transmissive surface (TS) component and a reflective surface (RS) component of a composite surface system are integrated on a single surface, in accordance with the present disclosure.
Figure 6B:
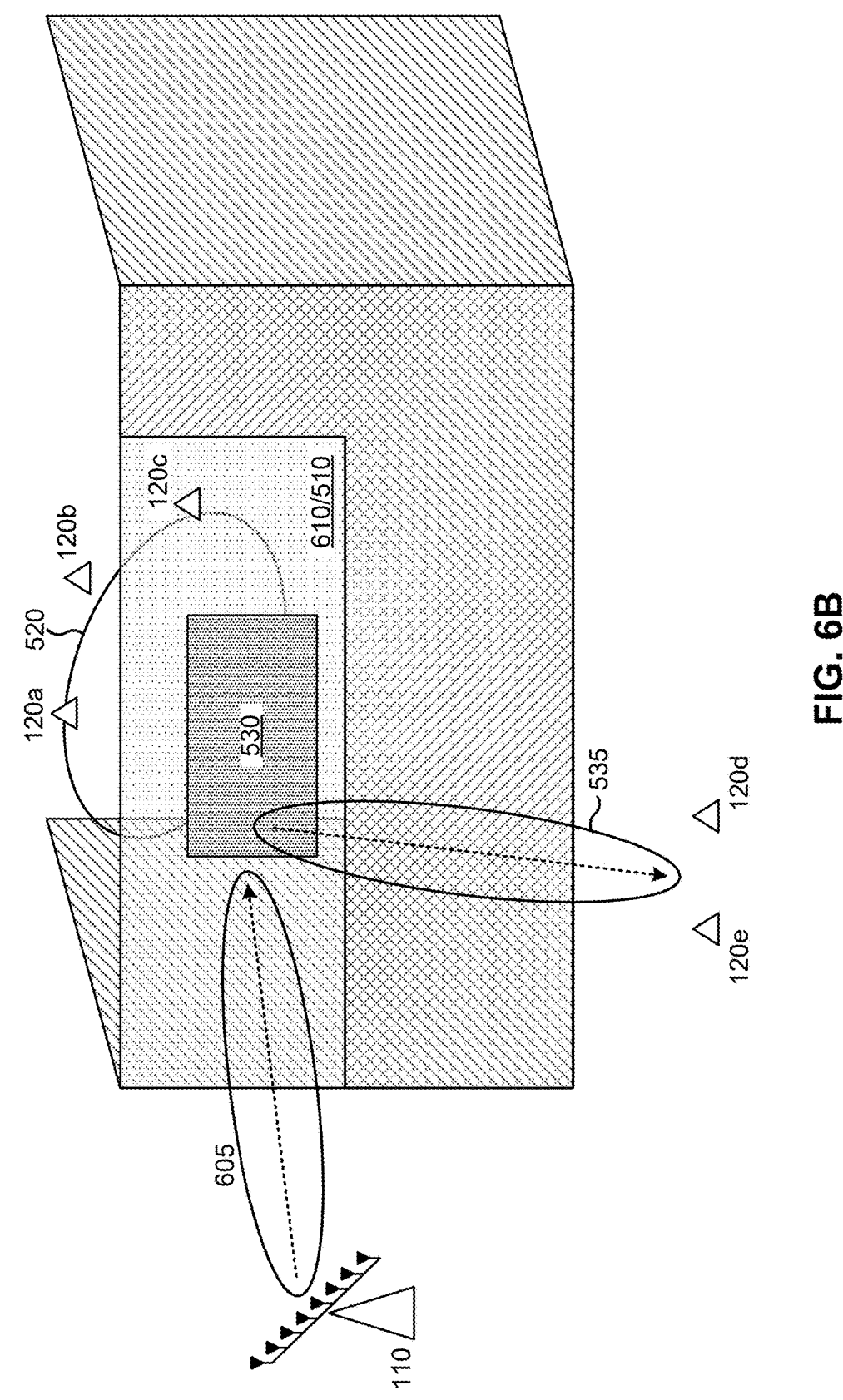

FIGS. 6A-6B are diagrams illustrating examples 600 and 650 in which the TS component 510 and the RS component 530 of a composite surface system are integrated on a single surface, in accordance with the present disclosure.

In example 600 of FIG. 6A, a network node 110 transmits a wireless communication signal 605 (e.g., a synchronization signal block (SSB) signal) such that the wireless communication signal 605 is incident on a surface 610 of a building that comprises a TS component 510 and an RS component 530. Here, a first group of UEs 120 (e.g., UE 120a, UE 120b, and UE 120c) are located within the building, while a second group of UEs 120 (e.g., UE 120d and UE 120c) are located outside of the building. While FIG. 6A is illustrated with RS component 530 and TS component 510, in an unillustrated example without RS component 530 and TS component 510, it is understood that the surface 610 (e.g., low-E glass, concrete, or other building materials, etc.) may well generate specular reflections of the wireless communication signal 605, but without RS component 530 and TS component 510, the surface 610 is not configured such that the wireless communication signal 605 is reflected within a tailored reflective FoV so as to provide coverage to the UE 120d and the UE 120c and is therefore not useful in covering such UEs 120 that are outside of the building. Therefore, in example illustrated in FIG. 6A, the TS component 510 and the RS component 530 on the surface 610 may be configured as described herein. Here, a single wireless communication signal 605 (e.g., a single SSB signal) transmitted by the network node 110 may be sufficient to cover the UEs 120 inside the building (due to the TS component 510 transmitting the wireless communication signal 605 within a tailored transmissive FoV 520) and to cover the UEs 120 outside of the building (due to the RS component 530 reflecting the wireless communication signal 605 within a tailored reflective FoV 535). In this way, a single wireless communication signal 605 (e.g., a single SSB signal) can be used to cover both indoor and outdoor UEs 120, thereby reducing energy consumption needed for signal transmission.

In example 650 of FIG. 6B, a network node 110 transmits a wireless communication signal 605 (e.g., an SSB signal) such that the wireless communication signal 605 is incident on a surface 610 of a building. In this example, the surface 610 serves as a TS component 510 and comprises an RS component 530. Here, a first group of UEs 120 (e.g., UE 120a, UE 120b, and UE 120c) are located within the building, while a second group of UEs 120 (e.g., UE 120d and UE 120e) are located outside of the building. As noted above with reference to FIG. 6A, without RS component 530, it is understood that specular reflection alone may not be useful in covering such UEs 120 that are outside of the building. In example 650, the surface 610 (e.g., traditional glass) can serve as the TS component 510 (e.g., such that the incident wireless communication signal 605 is transmitted within the transmissive FoV 20 inside the building), and the RS component 530 may be configured as described herein so as to provide coverage for the UEs 120 that are outside of the building. Therefore, a single wireless communication signal 605 (e.g., a single SSB signal) transmitted by the network node 110 may be sufficient to cover the UEs 120 inside the building (due to the surface 610/TS component 510 transmitting the wireless communication signal 605 within a tailored transmissive FoV 520) and to cover the UEs 120 outside of the building (due to the RS component 530 reflecting the wireless communication signal 605 within a tailored reflective FoV 535). In this way, a single wireless communication signal 605 (e.g., a single SSB signal) can be used cover both indoor and outdoor UEs 120, thereby reducing energy consumption needed for signal transmission.

Design considerations for a scenario such as that shown in FIGS. 6A and 6B may include, for example, incident signal directions within a range (e.g., an incident FoV), a desired transmissive FoV, a desired reflective FoV, a desired distance range for transmission, a desired distance range for reflection, or one or more constraints (e.g., an emission constraint, an aesthetic constraint, a visibility constraint, an optical-transparency constraint, an impact of tinting of a surface, or the like). Special design scenarios may include, for example, a scenario in which the TS component 510 is a transmissive background such as traditional glass (e.g., as described with respect to FIG. 6B) and an RS component 530 being placed on non-transparent parts of a façade (e.g., a frame), in which case an optical-transparency constraint may be relaxed.

As indicated above, FIGS. 6A-6B are provided as examples. Other examples may differ from what is described with respect to FIGS. 6A-6B.

Figure 7A:
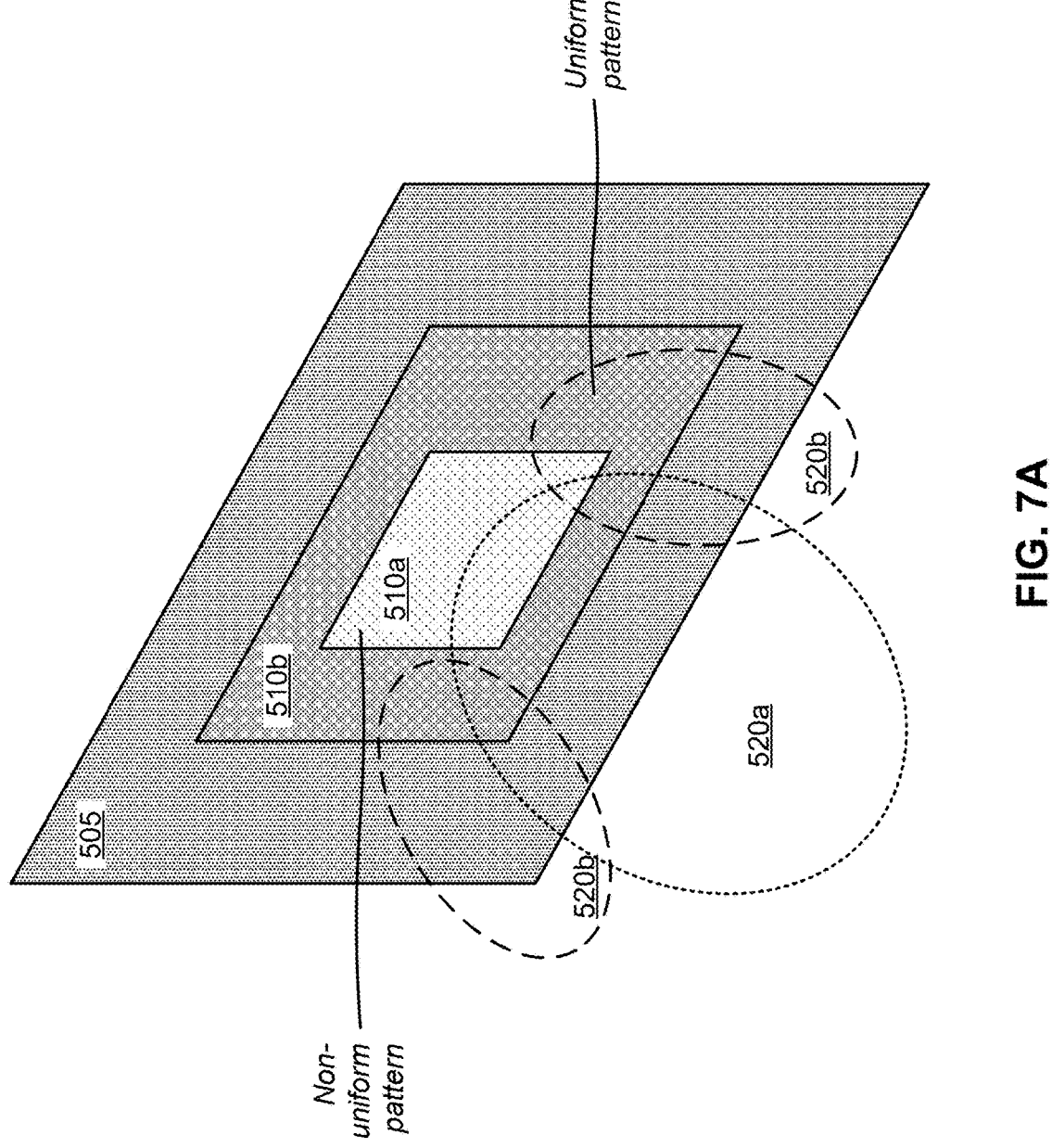
FIGS. 7A-7B are diagram illustrating examples of composite surface systems including multiple TS components, in accordance with the present disclosure.
Figure 7B:
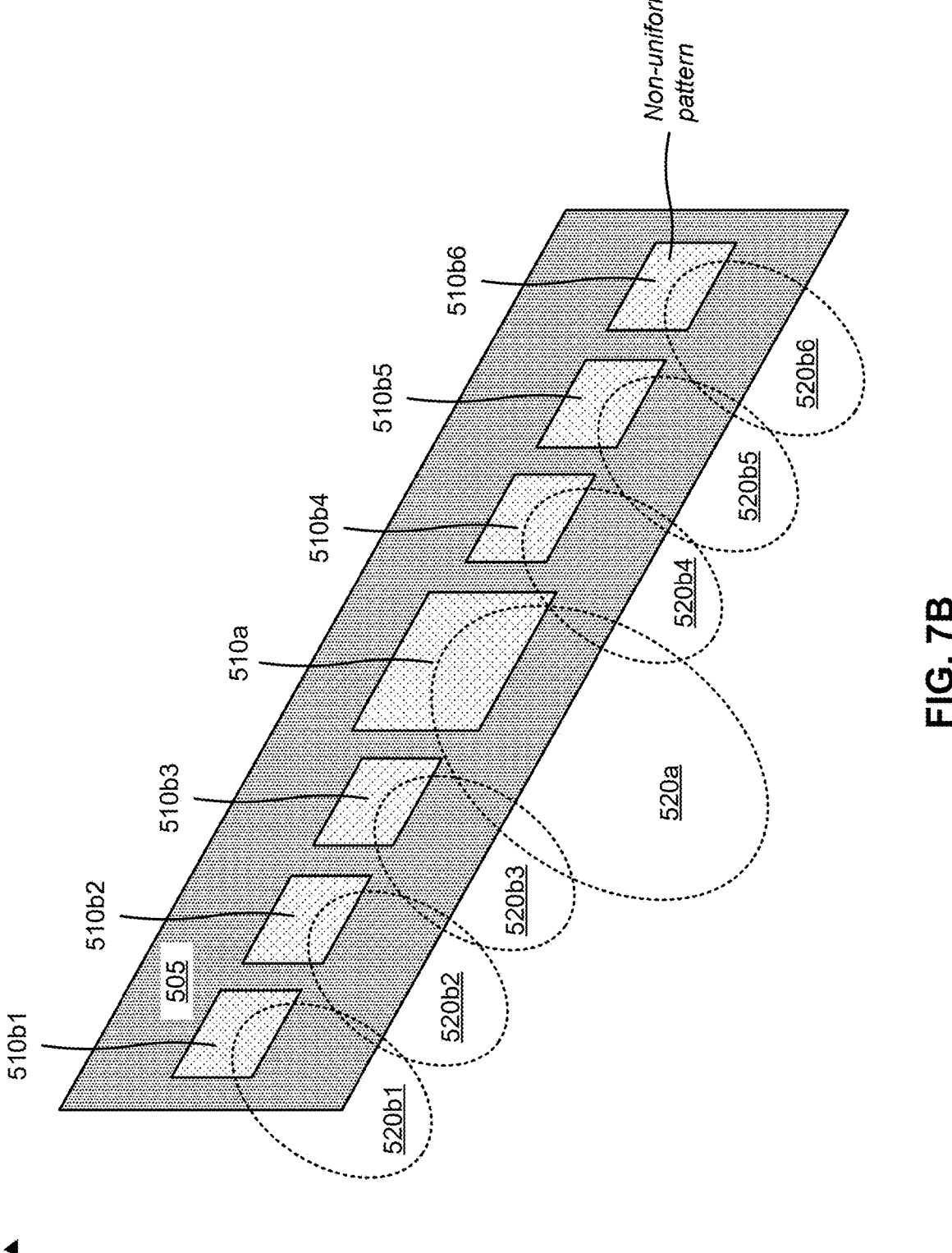

FIGS. 7A-7B are diagram illustrating examples 700 and 750, respectively, of composite surface systems including multiple TS components 510, in accordance with the present disclosure.

In some aspects, a composite surface system may include a plurality of TS components 510. For example, in some aspects, a composite surface system may include a TS component 510a (e.g., a first TS component) capable of transmitting an incident wireless communication signal 515 within a transmissive FoV 520a (e.g., a first transmissive FoV), and may include a TS component 510b (e.g., a second TS component) capable of transmitting the incident wireless communication signal 515 within a transmissive FoV 520b (e.g., a second transmissive FoV). In some aspects, the TS component 510a may include a non-uniform pattern region associated with controlling a size of the transmissive FoV 520a (e.g., as described above). In some aspects, the composite surface system may include one or more additional TS components 510 (e.g., an example of which is described below with respect to FIG. 7B), each of which is to transmit the incident wireless communication signal 515 within a respective transmissive FoV 520.

In some aspects, as shown in example 700 of FIG. 7A, a TS component 510a and may be overlaid with a TS component 510b. In one example, surface 505 may be a glass window. For example, as shown, the TS component 510a may be in a first region of a surface 505 and the TS component 510b may be in a second region of the surface 505, with the first region being surrounded by the second region. In some aspects, as illustrated in example 700, the TS component 510b may include a uniform pattern region associated with reducing signal strength loss of one or more radio frequencies of the wireless communication signal 515 compared to surface 505 without any TS component 510. For example, the TS component 510b may comprise be a with a uniform pattern.

In some aspects, the non-uniform pattern region of the TS component 510a can be configured in consideration of the surrounding uniform pattern region of the TS component 510b such that an overall transmissive FoV 520 (e.g., a combination of the transmissive FoV 520a and the transmissive FoV 520b in example 700) can be shaped so as to have desirable features of transmissive FoVs 520 as provided by both uniform and non-uniform patterned regions. For example, the non-uniform pattern region of the TS component 510b and the uniform pattern region of the TS component 510a may be designed such that the overall transmissive FoV 520 shown in example 700 is broader (e.g., as compared to an transmissive FoV 520 that would be provided by a uniform pattern region alone) and such that the incident wireless communication signal 515 is transmitted with a higher energy (e.g., as compared transmission that would be provided by a non-uniform pattern region alone). In some aspects, the non-uniform pattern region of the TS component 510b may be configured in consideration of the uniform pattern region of the TS component 510a to reduce or eliminate destructive interference. Thus, in some aspects, transmissive FoV 520b provided by the uniform pattern region of the TS component 510b provides a high pass-through signal strength and, therefore, enables a higher distance range for coverage of UEs 120, while the transmissive FoV 520a provided by the non-uniform pattern region of the TS component 510a is comparatively wider so as to improve coverage. In some aspects, as noted above, the non-uniform pattern of the TS component 510a may be configured in consideration of the pass-through signal from the uniform pattern region of the TS component 510b in order to, for example, avoid destructive interference within the transmissive FoVs 520a and 520b at a given distance.

In some aspects, a composite surface system including a TS component 510a and a TS component 510b as shown in example 700 may have a lower efficiency (e.g., defined as pass-through signal energy being divided by incident energy) as compared to a system using an identically sized uniform pattern region only. However, a composite surface system including a TS component 510a and a TS component 510b as shown in example 700 enables a broader overall transmissive FoV. Further, a composite surface system including a TS component 510*a* and a TS component 510*b* as shown in example 700 enables higher pass-through signal strength and has improved manufacturability as compared to a system that uses only a non-uniform patterned region.

In some aspects, as shown in example 750 of FIG. 7B, a composite surface system may include a primary TS component 510 (e.g., a TS component 510*a*) that is configured to transmit the incident wireless communication signal 515 within a transmissive FoV 520*a* and a plurality of satellite TS components 510*b* (e.g., a TS component 510*b*1, a TS component 510*b*2, a TS component 510*b*3, a TS component 510*b*4, a TS component 510*b*5, and a TS component 510*b*6) configured to transmit the incident wireless communication signal 515 within a respective transmissive FoV 520*b* (e.g., transmissive FoV 520*b*1, transmissive FoV 520*b*2, transmissive FoV 520*b*3, transmissive FoV 520*b*4, transmissive FoV 520*b*5, transmissive FoV 520*b*6). In some such aspects, as indicated in FIG. 7B, at least one of the plurality of satellite TS components 510*b* includes a non-uniform pattern region associated with controlling a size of a respective transmissive FoV 520. In some aspects, as illustrated in example 750, the primary TS component 510*a* is in a first region of a surface 505 and the satellite TS components 510*b* are other respective regions on the surface 505, with each region being separate on the surface 505. In some aspects, a size (e.g., a length, a width, an area, or the like) of the primary TS component 510*a* may be larger than a corresponding size of one or more of the satellite TS components 510*b*.

In some aspects, a composite surface system such as that shown in example 750 may provide a wider overall transmissive FoV when illuminated with incident wireless communication signals along one or more directions within an incident FoV. In some aspects, a size of the primary TS component 510*a* may be configured to provide coverage for a larger target distance within its transmissive FoV 520. In some aspects, as illustrated in example 750, the satellite TS components 510*b* may be distributed along a length of the surface 505 and may be comparatively smaller than the primary TS component 510*a*. In some aspects, as noted above, one or more satellite TS components 510*b* may be configured with a non-uniform pattern region so as to improve coverage for UEs 120 at close distances (e.g., which can be outside of a transmissive FoV 520 of the primary TS component 510 where satellite TS components 510*b* have a larger FoV compared to an FoV associated with primary TS component 510*a*). In some aspects, non-uniform patterns among the plurality of TS component 510 can be jointly designed so as to account for refracted signal contributions from any number of the TS components 510 of the composite surface system. Additionally, or alternatively, one or more satellite TS components 510 may in some aspects be configured with a uniform pattern so as to exploit main refracted beam broadening to improve coverage at distances closer to the surface 505.

In some aspects, a composite surface system may include multiple TS components 510 and an RS component 530. For example, a composite surface system may in some aspects include a plurality of TS components 510 (e.g., as shown in example 700 or example 750) and an RS component 530 (e.g., as shown in example 500 or example 550). Thus, in some aspects, a composite surface system may include a first TS component 510*a* capable of transmitting an incident wireless communication signal 515 within a first transmissive FoV 520*a* (and configured to limit signal strength loss of one or more radio frequencies of the incident wireless communication signal 515), a RS component 530 capable of reflecting the incident wireless communication signal 515 within a reflective FoV 535, and a second TS component 510*b* capable of transmitting the incident wireless communication signal 515 within a second transmissive FoV 520*b*.

As indicated above, FIGS. 7A-7B are provided as examples. Other examples may differ from what is described with respect to FIGS. 7A-7B.

The following provides an overview of some Aspects of the present disclosure:

Aspect 1: A composite surface system for wireless communication, comprising: a transmissive surface (TS) component capable of transmitting a wireless communication signal incident on the TS component, the TS component capable of transmitting the wireless communication signal within a transmissive field-of-view (FoV), and the TS component configured to limit signal strength loss of one or more radio frequencies of the wireless communication signal; and a reflective surface (RS) component capable of reflecting the wireless communication signal within a reflective FoV, the RS component comprising a non-uniform pattern region associated with controlling a size of the reflective FoV.

Aspect 2: The composite surface system of Aspect 1, wherein the RS component is configured to be placed within the transmissive FOV such that the RS component reflects the wireless communication signal after the wireless communication signal is transmitted by the TS component.

Aspect 3: The composite surface system of any of Aspects 1-2, wherein the TS component is configured to be placed on a first surface in an environment and the RS component is configured to be placed on a second surface in the environment, wherein the second surface is physically separated from the first surface.

Aspect 4: The composite surface system of any of Aspects 1-3, wherein the TS component comprises a uniform pattern region associated with reducing the signal strength loss of the one or more radio frequencies of the wireless communication signal.

Aspect 5: The composite surface system of any of Aspects 1-4, wherein the TS component comprises a non-uniform pattern region associated with controlling a size of the transmissive FoV.

Aspect 6: The composite surface system of Aspect 5, wherein the non-uniform pattern region comprises a transparent film with a pattern that is affixed to a glass surface.

Aspect 7: The composite surface system of any of Aspects 1-6, wherein the TS component and the RS component are integrated on a single surface in an environment.

Aspect 8: A composite surface system for wireless communication, comprising: a first transmissive surface (TS) component capable of transmitting a wireless communication signal incident on the composite surface system, the first TS component capable of transmitting the wireless communication signal within a first transmissive field-of-view (FoV), the first TS component comprising a first non-uniform pattern region associated with controlling a size of the first transmissive FOV; and a second TS component capable of transmitting the wireless communication signal within a second transmissive FoV.

Aspect 9: The composite surface system of Aspect 8, wherein the second TS component comprises a uniform pattern region associated with reducing signal strength loss of one or more radio frequencies of the wireless communication signal.

Aspect 10: The composite surface system of any of Aspects 8-9, wherein the first TS component is in a first region and the second TS component is in a second region, the first region configured to be surrounded by the second region on a surface in an environment.

Aspect 11: The composite surface system of any of Aspects 8-10, wherein the second TS component comprises a second non-uniform pattern region associated with controlling a size of the second transmissive FoV.

Aspect 12: The composite surface system of any of Aspects 8-11, wherein the first TS component is in a first region and the second TS component is in a second region, the second region being separate from the first region on a surface in an environment.

Aspect 13: The composite surface system of any of Aspects 8-12, wherein the first TS component is a primary component of the composite surface system and the second TS component is one of a plurality of satellite components of the composite surface system.

Aspect 14: A composite surface system, comprising: a transmissive surface (TS) component capable of transmitting an incident wireless communication signal within a transmissive field-of-view (FoV) and configured to limit signal strength loss of one or more radio frequencies of the incident wireless communication signal; and a reflective surface (RS) component capable of reflecting the incident wireless communication signal within a reflective FoV and capable of controlling a size of the reflective FoV.

Aspect 15: The composite surface system of Aspect 14, wherein the RS component comprises a non-uniform pattern region associated with controlling the size of the reflective FoV.

Aspect 16: The composite surface system of any of Aspects 14-15, wherein the TS component is a first TS component and the transmissive FoV is a first transmissive FoV, and the composite surface system further comprises a second TS component capable of transmitting the incident wireless communication signal within a second transmissive FoV.

Aspect 17: The composite surface system of Aspect 16, wherein the first TS component is in a first region and the second TS component is in a second region, the first region configured to be surrounded by the second region on a surface in an environment.

Aspect 18: The composite surface system of Aspect 16, wherein the first TS component is in a first region and the second TS component is in a second region, the second region being separate from the first region on a surface in an environment.

Aspect 19: The composite surface system of any of Aspects 14-18, wherein the TS component is configured to be placed on a first surface in an environment and the RS component is configured to be placed on a second surface in the environment, wherein the second surface is physically separated from the first surface.

Aspect 20: The composite surface system of any of Aspects 14-19, wherein the TS component comprises a uniform pattern region associated with reducing the signal strength loss of the one or more radio frequencies of the incident wireless communication signal.

Aspect 21: A system configured to perform one or more operations recited in one or more of Aspects 1-20.

Aspect 22: An apparatus comprising means for performing one or more operations recited in one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A composite surface system for wireless communication, comprising:
   a transmissive surface (TS) component capable of transmitting a wireless communication signal incident on the TS component, the TS component capable of transmitting the wireless communication signal within a transmissive field-of-view (FoV), and the TS component configured to limit signal strength loss of one or more radio frequencies of the wireless communication signal; and
   a reflective surface (RS) component capable of reflecting the wireless communication signal within a reflective FoV, the RS component comprising a non-uniform pattern region associated with controlling a size of the reflective FoV.

2. The composite surface system of claim 1, wherein the RS component is configured to be placed within the transmissive FoV such that the RS component reflects the wireless communication signal after the wireless communication signal is transmitted by the TS component.

3. The composite surface system of claim 1, wherein the TS component is configured to be placed on a first surface in an environment and the RS component is configured to be placed on a second surface in the environment, wherein the second surface is physically separated from the first surface.

4. The composite surface system of claim 1, wherein the TS component comprises a uniform pattern region associated with reducing the signal strength loss of the one or more radio frequencies of the wireless communication signal.

5. The composite surface system of claim 1, wherein the TS component comprises a non-uniform pattern region associated with controlling a size of the transmissive FoV.

6. The composite surface system of claim 5, wherein the non-uniform pattern region comprises a transparent film with a pattern that is affixed to a glass surface.

7. The composite surface system of claim 1, wherein the TS component and the RS component are integrated on a single surface in an environment.

8. A composite surface system for wireless communication, comprising:
   a first transmissive surface (TS) component capable of transmitting a wireless communication signal incident on the composite surface system, the first TS component capable of transmitting the wireless communication signal within a first transmissive field-of-view (FoV), the first TS component comprising a first non-uniform pattern region associated with controlling a size of the first transmissive FoV; and
   a second TS component capable of transmitting the wireless communication signal within a second transmissive FoV.

9. The composite surface system of claim 8, wherein the second TS component comprises a uniform pattern region associated with reducing signal strength loss of one or more radio frequencies of the wireless communication signal.

10. The composite surface system of claim 8, wherein the first TS component is in a first region and the second TS component is in a second region, the first region configured to be surrounded by the second region on a surface in an environment.

11. The composite surface system of claim 8, wherein the second TS component comprises a second non-uniform pattern region associated with controlling a size of the second transmissive FoV.

12. The composite surface system of claim 8, wherein the first TS component is in a first region and the second TS component is in a second region, the second region being separate from the first region on a surface in an environment.

13. The composite surface system of claim 8, wherein the first TS component is a primary component of the composite surface system and the second TS component is one of a plurality of satellite components of the composite surface system.

14. A composite surface system, comprising:
   a transmissive surface (TS) component capable of transmitting an incident wireless communication signal within a transmissive field-of-view (FoV) and configured to limit signal strength loss of one or more radio frequencies of the incident wireless communication signal; and
   a reflective surface (RS) component capable of reflecting the incident wireless communication signal within a reflective FoV associated with a size of the reflective FoV.

15. The composite surface system of claim 14, wherein the RS component comprises a non-uniform pattern region associated with controlling the size of the reflective FoV.

16. The composite surface system of claim 14, wherein the TS component is a first TS component and the transmissive FoV is a first transmissive FoV, and the composite surface system further comprises a second TS component capable of transmitting the incident wireless communication signal within a second transmissive FoV.

17. The composite surface system of claim 16, wherein the first TS component is in a first region and the second TS component is in a second region, the first region configured to be surrounded by the second region on a surface in an environment.

18. The composite surface system of claim 16, wherein the first TS component is in a first region and the second TS component is in a second region, the second region being separate from the first region on a surface in an environment.

19. The composite surface system of claim 14, wherein the TS component is configured to be placed on a first surface in an environment and the RS component is configured to be placed on a second surface in the environment, wherein the second surface is physically separated from the first surface.

20. The composite surface system of claim 14, wherein the TS component comprises a uniform pattern region associated with reducing the signal strength loss of the one or more radio frequencies of the incident wireless communication signal.

*    *    *    *    *